United States Patent [19]

Steward

[11] Patent Number: 5,756,874
[45] Date of Patent: May 26, 1998

[54] ELECTROCHEMICAL CELL FOR PROCESSING ORGANIC WASTES

[75] Inventor: G. Anthony Steward, Los Altos Hills, Calif.

[73] Assignee: Eosystems, Inc., Sunnyvale, Calif.

[21] Appl. No.: 540,531

[22] Filed: Oct. 10, 1995

[51] Int. Cl.$^6$ ................................................. C02F 1/461
[52] U.S. Cl. ................ 588/204; 204/255; 204/257; 204/263; 204/268; 204/269; 204/275; 205/688; 205/703; 205/743; 205/748; 205/749
[58] Field of Search ....................... 204/255, 257, 204/263, 268, 269, 275; 205/688, 703, 743, 748, 749; 588/204

[56] References Cited

U.S. PATENT DOCUMENTS

| | | | |
|---|---|---|---|
| 3,269,932 | 8/1966 | C. H. Worsham et al. | |
| 3,755,130 | 8/1973 | Zabolotny | 204/237 |
| 3,793,171 | 2/1974 | Zabolotny et al. | 240/130 |
| 3,890,244 | 6/1975 | Carlin | 252/301.1 |
| 3,953,305 | 4/1976 | Connolly | 204/97 |
| 3,994,790 | 11/1976 | Inoue | 204/130 |
| 4,004,993 | 1/1977 | Horner et al. | 204/131 |
| 4,118,294 | 10/1978 | Pellegri | |
| 4,389,288 | 6/1983 | Vaughan | 204/101 |
| 4,405,420 | 9/1983 | Vaughan | 204/105 M |
| 4,468,297 | 8/1984 | Sawyer et al. | 204/59 R |
| 4,564,432 | 1/1986 | Nagai et al. | 204/237 |
| 4,592,814 | 6/1986 | Vaughan et al. | 204/78 |
| 4,608,136 | 8/1986 | Vaughan et al. | 204/106 |
| 4,608,137 | 8/1986 | Vaughan et al. | 204/129 |
| 4,647,349 | 3/1987 | Kreh et al. | 204/59 R |
| 4,692,227 | 9/1987 | Spotnitz et al. | 205/703 |
| 4,699,700 | 10/1987 | Dhooge | 204/105 R |
| 4,701,246 | 10/1987 | Fujita et al. | 204/130 |
| 4,749,519 | 6/1988 | Koehly et al. | 252/627 |
| 4,752,364 | 6/1988 | Dhooge | 204/151 |
| 4,874,485 | 10/1989 | Steele | 204/130 |
| 4,925,540 | 5/1990 | Dhooge | 204/157.42 |
| 4,925,643 | 5/1990 | Steele | 423/393 |
| 5,047,224 | 9/1991 | Dhooge | 423/437 |
| 5,516,972 | 5/1996 | Farmer et al. | 588/210 |

FOREIGN PATENT DOCUMENTS

| | | |
|---|---|---|
| 0 089 185 A3 | 9/1983 | European Pat. Off. . |
| 0 297 738 A1 | 1/1989 | European Pat. Off. . |
| 431 313 A1 | 10/1990 | European Pat. Off. . |
| C 25 B 9/00 | 9/1993 | Germany . |
| 2 206 341 | 1/1989 | United Kingdom . |
| 2 226 331 | 6/1990 | United Kingdom . |
| WO 94/29907 | 12/1994 | WIPO . |

OTHER PUBLICATIONS

D.F. Steele, Electrochemistry and waste disposal, Chemistry in Britain, Oct. (1991), pp. 915–918.

D.F. Steel, Electrochemical destruction of toxic organic industrial waste, Platinum Metals Rev., (1990), 34, (1), 10–14. (no month).

D.F. Steel, D. Richardson, J.D. Campbell, D.R. Craig and J.D. Quinn, I. Chem. E. Symposium Series No. 116, pp. 237–249. (no date).

(List continued on next page.)

*Primary Examiner*—Arun S. Phasge
*Attorney, Agent, or Firm*—Townsend and Townsend and Crew; Guy W. Chambers

[57] ABSTRACT

An electrochemical cell (20) which is effectively leakproof and can be incorporated into an easily serviceable cell pack (80). Within the cell are a plurality of parallel electrode plates (44, 46, 56) which act as anode and cathode reaction surfaces for processing chemicals. The electrochemical cell housing (33) is preferably formed of durable plastic with all fluid inlets (36, 38) and outlets (40, 42) on its upper face (30). One or more input manifolds (48, 50) are provided to route process chemicals to the bottom of the cell and then distribute them upward across the electrode plates. The housing is formed as a one-piece, monolithic structure with an opening left on top for fitting the top face. At the end of cell assembly, the top face is attached to the remainder of the cell housing so as to form a sealed cell.

30 Claims, 6 Drawing Sheets

OTHER PUBLICATIONS

L. Carlsson, B. Sandgren and D. Simonsson, Design and Performance of a Modular, Multi-purpose Electrochemical Reactor, J.Electrochem.Soc., Feb (1993), 130, (2), pp. 342–346.

E. Mentasi and L. J. Kirschenbaum, Oxidation of Organic Compounds by ilver (II), Reactions with Aliphatic Diols and α-Hydroxy Acids, Inorganica Chimica Acta, 134, (1987), pp. 283–288. (no month).

D. Pletcher and F. C. Walsh, Industrial Electrochemistry, Second Edition, Chapman and Hall, Ltd., New York, 1990. (no month).

M. Buehler and J. Surma, "Electrochemical Processes" in Separation Techniques in Nuclear Waste Management, T. E. Carlson, N.A. Chipman and C.M. Wai, eds., CRC Press., Boca Raton, 1996, pp. 91–107. (no month).

L.A. Bray, J.L. Ryan and E.J. Wheelwright, Development of CEPOD Process for Dissolving Plutonium Oxide and LEaching Plutonium for Scraps, Prepared for the U.S. Dept. of Energy under Contract DE-AC06-76RLO 1830. Nov. 1985.

Brochure entitled "The EC Eclectro MP–Cell, " ElectroCell AB, Sweden. (no date).

Brochure entitled "ICI Technical Newsheet, the FM21 Electrolyser fo Electrosynthesis: The Associated Materials Engineering Considerations," ICI Chemicals & Polymers Limited Electrochemical Technology, Great Britain. (no date).

Brochure entitled "The ICI Technical Advantage," ICI Chemicals & Polymers Limited Electrochemical Technology, Great Britain. (no date).

Brochure entitled "The FM01–LC Electrolyser," ICI Chemicals & Polymers Limited Electrochemical Technology, Great Britain. (no date).

ELECTROCHEMICAL CELL FOR PROCESSING ORGANIC WASTES

TECHNICAL FIELD OF THE INVENTION

The present invention relates to equipment used for promoting chemical reactions through the application of an electrical current. More particularly, the present invention is directed to an electrochemical cell design and process for safely and conveniently transforming hazardous organic wastes into relatively harmless end products, such as water and carbon dioxide.

BACKGROUND OF THE INVENTION

Every year, many millions of tons of hazardous organic wastes are generated by the world's chemical industries. Included in such hazardous organic wastes are compounds which are either poisonous or carcinogenic to humans and other forms of animal life. Finding an inexpensive, environmentally acceptable way to dispose of or destroy such hazardous organic wastes has been a major and longstanding problem.

Up to now, burial and incineration have been the primary means of treating such hazardous organic wastes. Both approaches have serious drawbacks. Burial of hazardous organic wastes risks contamination of ground water and thus infusion of poisonous or carcinogenic compounds into the public drinking water. For this reason, it is now illegal in many places to put hazardous organic wastes into drums for disposal at landfill sites. Incineration relies on heat, usually in the form of a flame, to burn hazardous organic wastes, with no guarantee that the hazardous organic wastes will be completely destroyed. In fact, flame oxidation is a chaotic process in which complete oxidation is uncommon. Operating incinerators have continually failed certification specifications by either incompletely destroying hazardous organic wastes, producing additional forms of hazardous waste compounds or polluting the atmosphere through stack discharge.

Recently, mediated electrochemical oxidation (MEO) processes have been developed as an alternative to burial or incineration of hazardous organic wastes. MEO is a generic designation for a family of technologies that includes all metal mediated or catalyzed electrochemical oxidation processes. Useful metal mediators/catalysts for such MEO processes include cerium (Ce), cobalt (Co), iron (Fe) and silver (Ag). Cerium MEO processes have recently been tested at the Pacific Northwest Laboratories while cobalt MEO processes have recently been the subject of work at the Lawrence Livermore National Laboratory. In operation, the metal mediator/catalyst in an MEO process is activated at the anode of an electrochemical cell while immersed in an electrolyte solution consisting of both an acid solution, such as nitric acid ($HNO_3$), sulfuric acid ($H_2SO_4$) or hydrochloric acid (HCl), and the hazardous organic wastes to be treated. Together, the activated metal mediator/catalyst and acid solution, referred to as an "anolyte" solution, break down the hazardous organic wastes into relatively harmless byproducts such as water or carbon dioxide. To complete the electrical circuit in the MEO process, an additional electrolyte acid solution or "catholyte" is exposed to the cathode of the electrochemical cell and allowed to receive selected ions (e.g., $H^{3O}$ ions) from the anolyte solution.

Ideally, the MEO process operates in a closed system so that the hazardous organic wastes, including all reaction intermediates, are fully contained until completely degraded or rendered harmless. Under these conditions, the MEO process does not produce or release any particles of incomplete combustion. Significantly, after the metal mediator/catalyst is reduced in the process of degrading the hazardous organic wastes, it is then typically recycled for reuse in the MEO process through reoxidation at the anode.

At the heart of the MEO process is the electrochemical reaction chamber or "cell". In the prior art, such electrochemical cells have typically been constructed in a "plate and frame" manner. FIG. 1 shows a commercial form of such a "plate and frame" electrochemical cell which is produced by ICI Chemicals & Polymers of Cheshire, England. In this "plate and frame" electrochemical cell 10, a series of flat spacers 12, electrodes 14 and gaskets 16 are sandwiched and bolted together between two end plates 18. The electrolyte fluids are usually introduced horizontally into this type of "plate and frame" electrochemical cell and retrieved in the same manner. Due to the multiplicity of sandwiched parts in this type of "plate and frame" electrochemical cell, there are many opportunities for possible leaks, particularly as the gaskets start to wear and weaken. When dealing with hazardous organic wastes with poisonous or carcinogenic compounds, such leaks could lead to catastrophic problems for the workers who must use such electrochemical cells. Moreover, if a piece of the "plate and frame" cell happens to be defective or broken, the entire cell must typically be taken off line and disassembled in a lengthy, time-consuming process before the problem can be fixed.

SUMMARY OF THE INVENTION

The present invention provides an electrochemical cell and cell pack which, together, are easily serviceable and effectively leakproof. Within the cell pack are a plurality of sealed cells whose housings are preferably formed of durable plastic with all fluid inlets and outlets on the upper surface of the housing. On two opposing sides of these cells are anode and cathode end plates which are preferably sealed at their outer edges within the plastic housing. Each of these end plates can be connected to a source of electrical current by, for example, electrode posts which extend through the cell housing. Between the anode and cathode end plates are typically a plurality of parallel intermediate plates which act as intermediate anode and cathode reaction surfaces. Parallel ion exchange membranes are preferably placed between all electrode plates to physically separate the anolyte solutions, which contact the plates' anode reaction surfaces, from the catholyte solutions, which contact the plates' cathode reaction surfaces, while still allowing proton ions to pass between the two solutions.

In the cell housing, inlet chemicals are channeled from the top surface to the bottom and then evenly distributed upward across the various reaction surfaces by internal manifolds and a series of V-grooved baffles. The reacted fluids are then forced out of the cell through a upper series of V-grooved baffles and internal outlet manifolds. The cell housing is preferably formed as a one-piece, monolithic structure. An opening is left at the top of the cell housing so that, once the plates, membranes, manifolds and V-grooved baffles are inserted into the housing, a top plate can be welded onto the housing to cover the opening and seal the cell.

Each cell of the present invention is preferably inserted with identical cells into a larger cell pack formed of corrosion resistant plastic. As with the individual cells, the cell pack is preferably formed as a one-piece, monolithic structure with an opening on top. Within the cell pack, the individual cells are connected together electrically and, through cell pack manifolds, connected to the sources of anolyte and catholyte solutions. To provide additional protection against leakage, a top plate is firmly, but removably, affixed to the cell pack housing to cover the opening and seal the cell. The cell pack top is removably affixed so that any defective cells within the cell packs can be easily removed and replaced with working cells without significant interruption of the process or leakage.

The cells and cell packs of the present invention can be advantageously used to process hazardous organic wastes in a Mediated Electrochemical Oxidation (MEO) process. Preferred MEO processes for use with the cell and cell pack of the present invention include a cerium (Ce) catalyzed process with nitric acid ($HNO_3$) electrolyte solutions and a cobalt (Co) catalyzed process with a either nitric acid or sulfuric acid ($H_2SO_4$) electrolyte solutions.

DESCRIPTION OF THE SPECIFIC EMBODIMENTS

Figure 1:
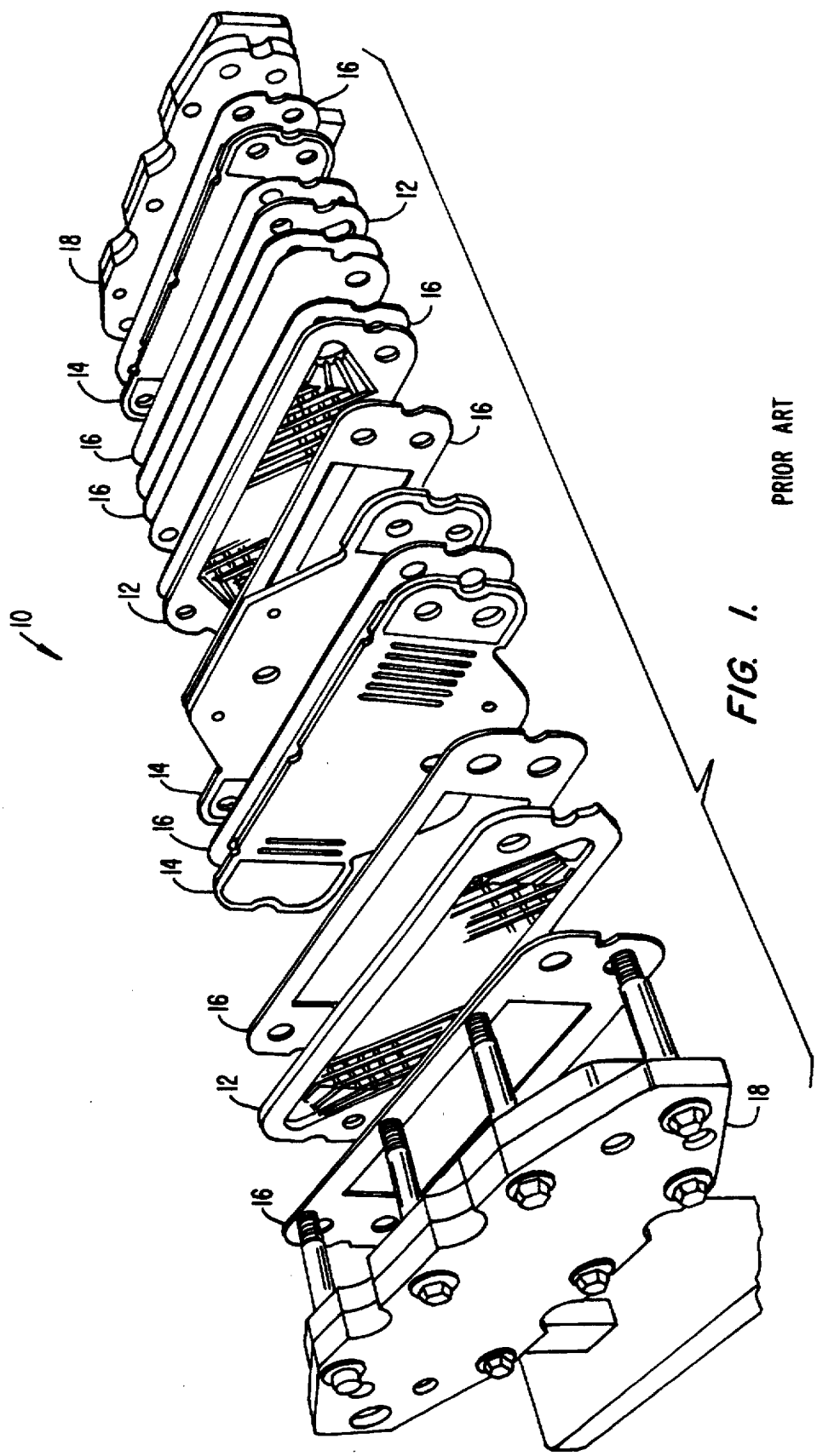
FIG. 1 shows an exploded view of a representative "plate and frame" electrochemical cell from the prior art.
Figure 2:
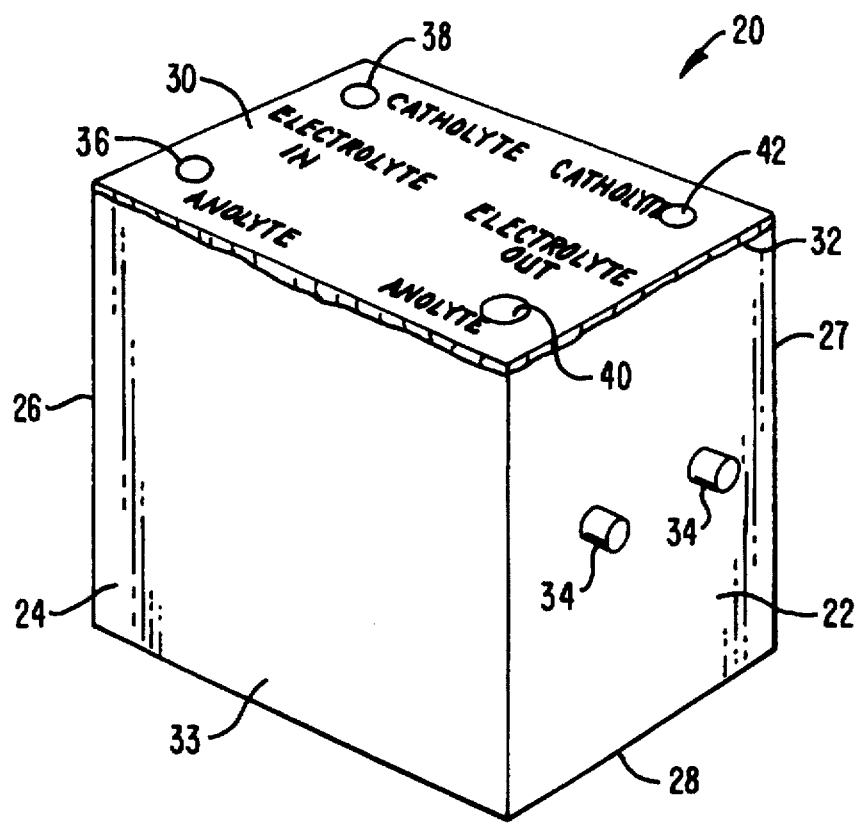
FIG. 2 shows a perspective view of a single electrochemical cell of the present invention.

Referring now to FIG. 2, a preferred form of electrochemical cell 20 is shown as it would appear from the outside. This electrochemical cell 20 is preferably formed in the shape of a box or car battery having a front face 24, rear face 27, two side faces 22, 26, a top face 30 and a bottom face 28. These six faces 22, 24, 26, 27, 28, 30 together form the housing 33 of the electrochemical cell 20. The housing 33 of the electrochemical is preferably formed of a durable plastic which is resistant to degradation from acids, organic wastes or metal ions. A suitable form of plastic for the cell housing 33 is the polyvinylidene fluoride plastic ("PVDF") manufactured by Rhone-Poulenc and designated by the Rhone-Poulenc tradename KYNAR®. Alternative plastics include polytetrafluoroethylene (PTFE or TEFLON®), TEFLON® coated plastics and the PFA plastic manufactured by E.I.DuPont de Nemours and Company of Wilmington, Del.

To prevent leakage during use, the entire cell housing 33 is preferably formed in one-piece as a monolithic structure with an opening left for the top face 30. This can be accomplished, for example, by injection molding. The top face 30 is formed separately by, for example, a similar injection molding process. Once the internal parts are fitted into the lower portion of the cell housing 33, the top face 30 is then preferably secured to the lower portion of the cell housing in a way that provides a leakproof seal. This can be accomplished, for example, by plastic welding the edges 32 of the top face to the exposed edges of the lower portion of the cell housing 33 using a nitrogen gas welding rod. Alternatively, other chemical, mechanical or thermal bonding techniques known to those in the art can be used to attach the top face 30 to the remainder of the cell housing 33 in a way which provides a leakproof seal.

Figure 3:
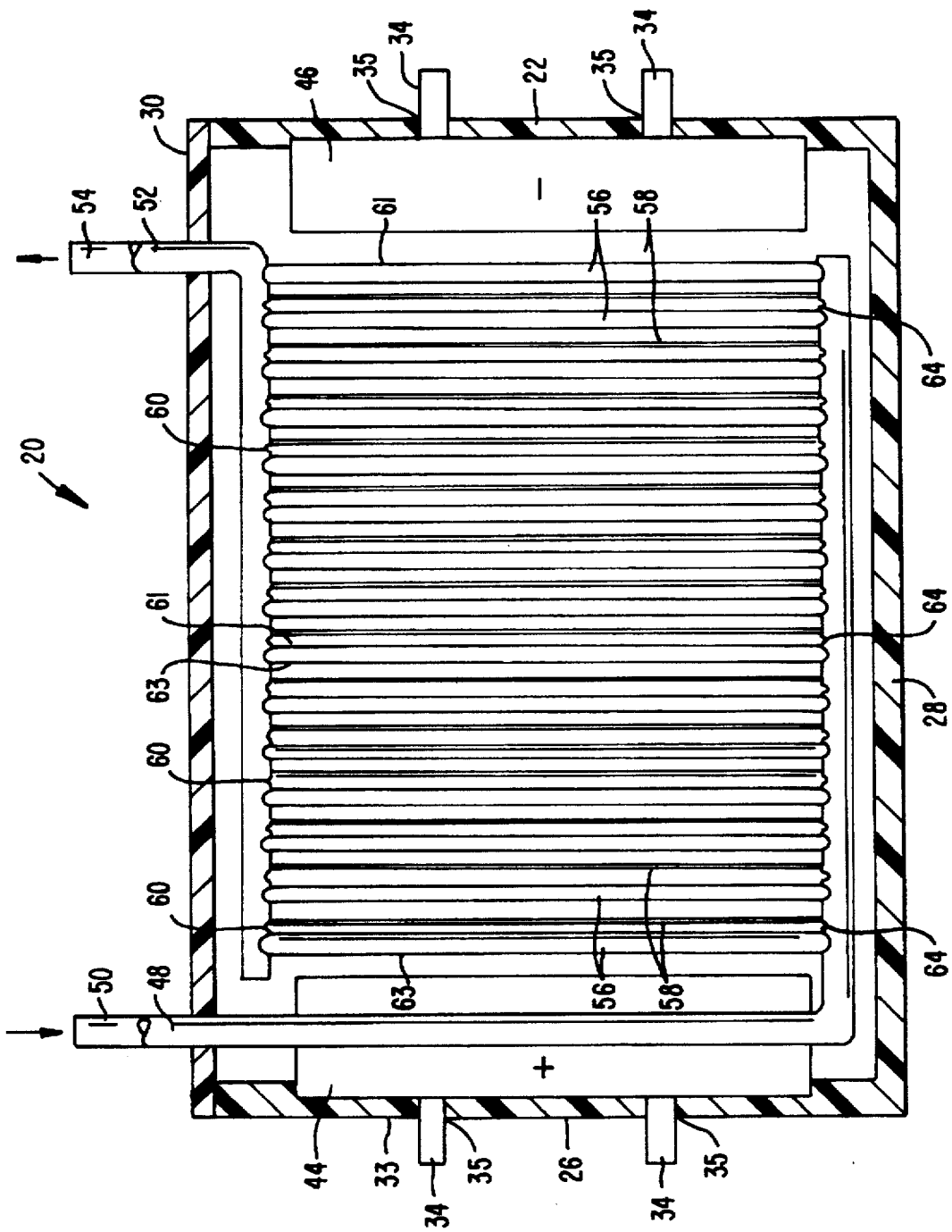
FIG. 3 shows a front cutaway view of the electrochemical cell shown in FIG. 2.

Protruding from each side face 22, 26 of the cell housing 33 are two electrode posts 34. As shown in FIG. 3, these electrode posts 34 allow electrical current to pass through the cell housing 33 to the anode 44 and cathode 46 end plates. Two electrode posts 34 are shown on each side face 22, 26 to allow the cell to use high current densities, on the order 3,500–4,000 amps/$m^2$, without overloading the electrical connections to the cell. These electrode posts 34 are preferably formed from highly conductive, corrosion resistant metals such as platinum coated titanium, titanium or titanium coated copper. In order to maintain a liquid seal within the cell, the edges of the anode 44 and cathode 46 end plates are preferably encased within the cell housing 33. By encasing the edges of the end plates 44, 46, liquid within the cell will be prevented from seeping behind the end plates and into the electrode post holes 35.

Referring again to FIG. 2, on the top face 30 of the cell 20 are various ports 36, 38, 40, 42 for introducing and retrieving electrolyte solutions. In the preferred embodiment, these include an anolyte input port 36, a catholyte input port 38, an anolyte output port 40 and a catholyte output port 42. Where the cell output consists of mixed liquid and gas phases, there can also be separate liquid and gas output ports for both anolyte and catholyte. Alternatively, in those applications where only one electrolyte solution is used, there can be one input port and one output port.

Figure 4:
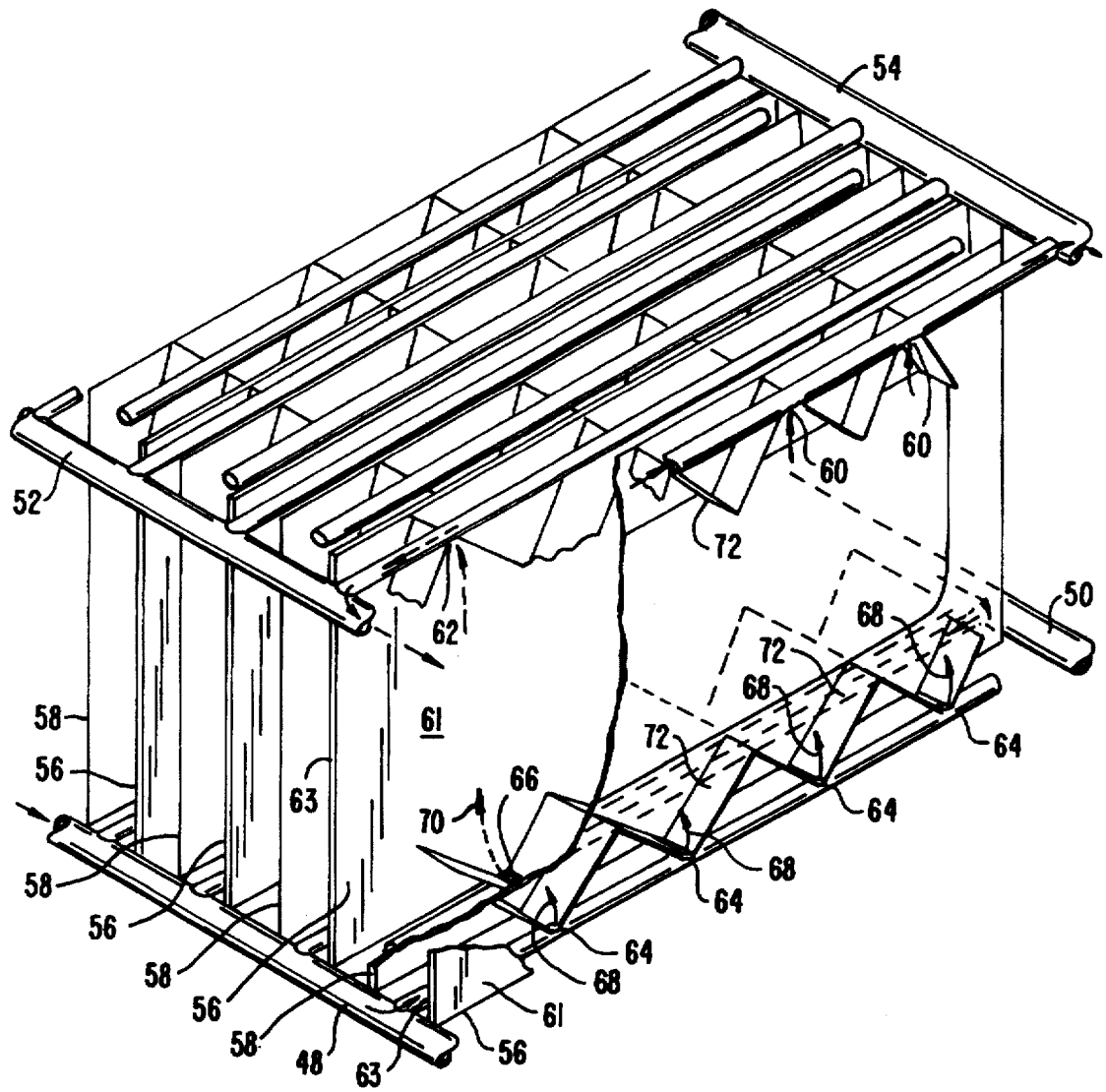
FIG. 4 shows a close-up perspective view of internal manifolding and fluid flow in the electrochemical cell of FIG. 2.
Figure 5:
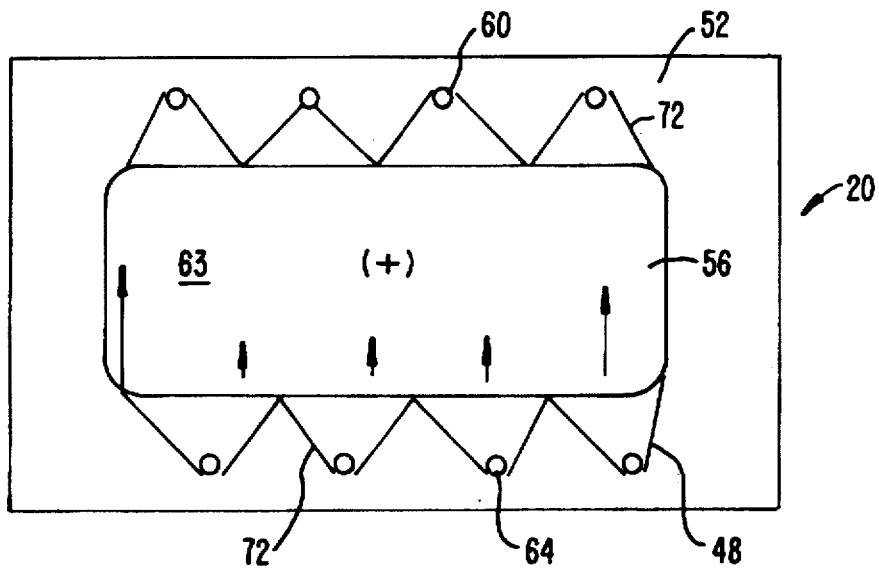
FIG. 5 shows a side cutaway view illustrating fluid flow across an intermediate electrode plate of FIG. 2 electrochemical cell.

FIGS. 3, 4 and 5 show the internal electrochemical cell 20 configuration of the present invention. The internal components of the electrochemical cell include end plates 44, 46, intermediate plates 56, ion exchange membranes 58, manifolds 48, 50, 52 and 54 and V-grooved baffles 72. When anolyte and catholyte electrolyte solutions are introduced into the cell 20 through ports 36, 38, they are routed to the bottom of the cell by anolyte 48 and catholyte 50 input manifolds. As with the housing 33 of the cell itself, these manifolds should be formed of a durable plastic, such as PVDF, which is resistant to degradation from acids, organic wastes or metal ions. Across the bottom of the cell, numerous holes 64, 66 are provided in manifolds 48, 50 to distribute the anolyte and catholyte solutions through a network of electrode plates 44, 46, 56 and ion exchange membranes 58.

The network of electrode plates 44, 46, 56 and ion exchange membranes 58 is bounded at its ends by a positively-charged anode end plate 44 and a negatively-charged cathode end plate 46. In the preferred embodiment, these end plates 44, 46 are the only plates in the cell which are connected to a current source. These end plates 44, 46 are connected to the electrical current source through attached electrode posts 34. In this type of bipolar or series configuration, each of the intermediate electrode plates 56 takes on an induced charge dependent upon its proximity to the anode 44 and cathode 46 end plates. In other words, the potential of an intermediate plates 56 will be progressively less the farther the intermediate plate 56 is from the anode end plate 44. Alternatively, electrical connections can be made with a bus (not shown) to all of the end 44, 46 and intermediate 56 plates to create a monopolar or parallel electrical configuration. With such a monopolar configuration, the intermediate plate voltages can be set at a greater variety of values. Nonetheless, the bipolar configuration is preferred over the monopolar configuration because it requires fewer electrical connections, demands less power and is less expensive to construct.

The electrode plates 44, 46, 56 for the cell of the present invention are preferably constructed of conductive, corrosion resistant metals, such as platinum plated titanium. Titanium plated copper would be another example of a suitable combination of metals for the electrode plates 44, 46, 56 of the present invention. For the embodiment of cell shown in FIGS. 2-6, there are two end plates 44, 46 and fifteen intermediate plates 56. The operating current densities for such a cell can be on the order of 3500-4000 amps/m$^2$ applied potential between the two end plates 44, 46 on the order of 3-4 volts. An acceptable surface area size for such electrode plates would be 0.5 meters by 0.25 meters for a 0.125 m$^2$ total surface area per plate.

An ion exchange membrane 58 is placed between each set of successive plates 44, 46, 56 in the cell. This ion exchange membrane 58 serves to physically separate the anolyte and catholyte solutions which are passing along the plate surfaces in close proximity to one another while nonetheless allowing selective ions to pass between these electrolyte solutions. FIG. 4 provides a close-up view of several intermediate plates 56 and membranes 58 in the cell and is useful to illustrate how a MEO process would work in the present cell. In the preferred bipolar cell, the intermediate plates 56 shown in FIG. 4 would have an induced voltage differential dependent upon their proximity to the end plates 44, 46. The intermediate plate 56 which is closer to the cathode would have a higher potential than the intermediate plate which is closer to the anode. While the voltage of each intermediate plate is at a single value, the surface of the intermediate plate closer to cathode 61 is contacted with catholyte solution 70 and used as a cathode reaction surface. By contrast, the surface of the intermediate plate closer to the anode 63 is contacted with anolyte solution 68 and used as an anode reaction surface. At the ends of the cell, the cathode end plate 46 would be placed in contact with catholyte solution 70 and the anode end plate 44 is placed in contact with anolyte solution 68. For the cerium (Ce) and cobalt (Co) mediated MEO processes, the ion exchange membrane is a membrane which allows protons (H$^{3o}$) to pass through. A membrane which has been found to be suitable for this purpose is a NAFION® ion exchange membrane made by E.I.DuPont de Nemours and Company of Wilmington, Del.

Referring now to FIG. 4, the flow of electrolyte solution 68, 70 across the reaction surfaces 61, 63 of the intermediate plates 56 is shown. To achieve an even distribution of anolyte solution 68 across the anode reaction surfaces 63, numerous ports 60, 64 are provided in the anolyte input 48 and output 52 manifolds which run across the length of the intermediate plate 56. Similarly, to achieve an even distribution of catholyte solution 70 across the cathode reaction surfaces 61, numerous ports 62, 66 are provided in the catholyte input 50 and output 54 manifolds which run across the length of the intermediate plate 56.

Comparing FIGS. 3, 4 and 5, one can see that a matrix or grid of ports 60, 62, 64, 66 is created for each of the input 48, 50 and output 52, 54 manifolds. In other words, rows of manifolds ports 60, 62, 64, 66 extend not only across individual plates as shown in FIGS. 4 and 5, but transversely across the series of plates and membranes as shown in FIG. 3. Through this matrix or grid of ports, the use of all available reaction surfaces can be optimized.

V-grooved baffles 72 are used in conjunction with both the anolyte input 48 and output 52 manifolds to better spread the flow evenly across the reaction surface. Having even flow across the reaction surface is important because the rate of reaction in MEO processes is proportional to the amount of electrode area covered by electrolyte solution.

Figure 6:
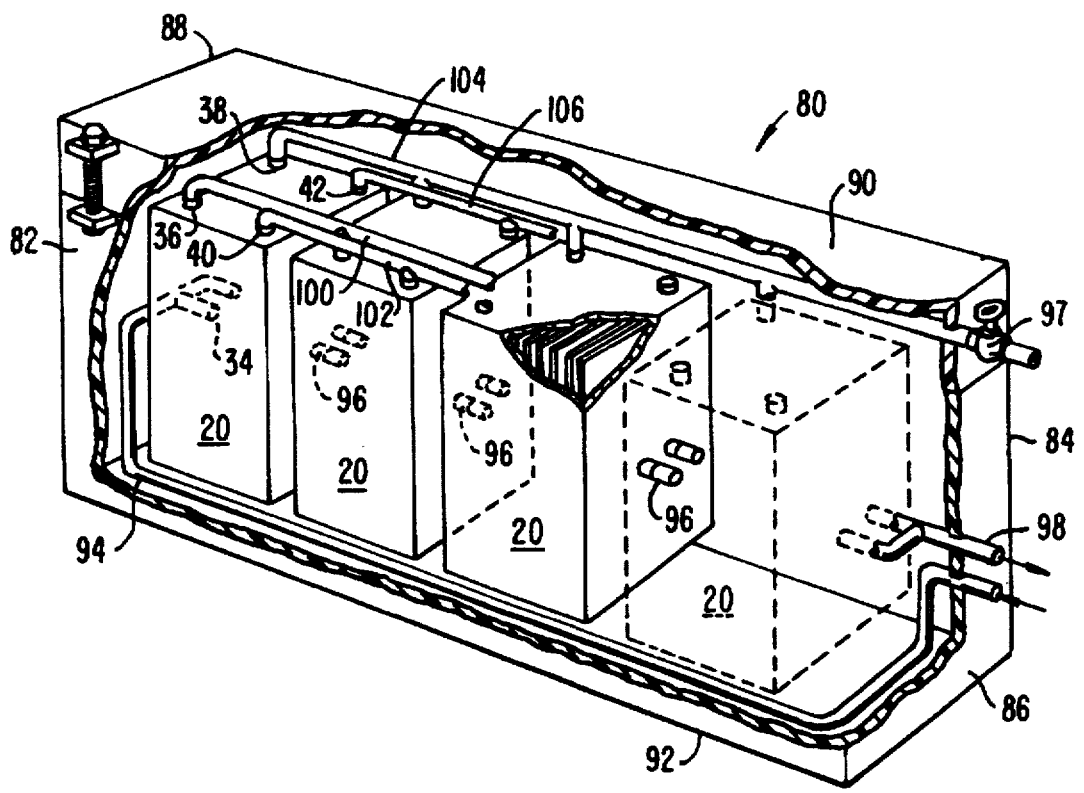
FIG. 6 shows a perspective view of a cell pack containing four electrochemical cells.

To increase volume of flow, provide economies and further protect against leaks, two or more electrochemical cells 20 of the present invention can be assembled together into a cell pack 80. Such a cell pack 80 holding four electrochemical cells 20 is shown in FIG. 6. While the cells 20 and cell pack 80 could plainly be made in other shapes, FIG. 6 shows the advantage of making the cells 20 and cell pack 80 in box-like shapes which require a minimum of space to be assembled together. Like the individual cells 20, the cell pack 80 has a front face 82, a rear face 84, two side faces 86, 88, a top face 90 and a bottom face 92. Also like the individual cells, the cell pack is preferably formed in one piece from a durable plastic such as PVDF with an opening left for top face 90. By forming the cell pack 80 in one piece, a second level of protection is provided against the possibility of bottom end leaks. Unlike the individual cells 20, though, the top face 90 of the cell pack 80 should be removably attached to the remainder of the cell pack 80 with bolts, clips or similar removable attachment mechanism. By making this attachment mechanism removable, defective cells 20 can easily be retrieved from the cell pack 80 and replaced without lengthy disruption of the electrochemical process.

To supply the necessary electrical current and electrolyte solutions to the cell packs 20 for processing, electrical connections 94, 96, 98 and fluid manifolds 100, 102, 104, 106 are provided within the cell pack 80. More specifically, electrical current is provided to the cell pack 80 through cables 94, 98. To handle larger amounts of current, cables 94, 98 should have at least two wires which connect separately to the outward facing electrode posts 34 in each end cell 20. In FIG. 6, the cells 20 are shown to be electrically connected in series to one another through intermediate cables 96. Alternatively, a parallel arrangement could be used where an electrical connection is made directly to each cell. The advantages and disadvantages of the series and parallel arrangements would be the same as those previously described for the individual cell 20 electrical arrangements. To protect the electrical cables 94, 96, 98 from causing short circuits, the electrical cables 94, 96, 98 should preferably be wrapped or encased in a material which is resistant to corrosion from acids, organic wastes or metal ions, such as PVDF.

Cell pack fluid manifolds 100, 102, 104, 106 are used to distribute and retrieve electrolyte solutions from the appropriate ports 36, 38, 40, 42 in each cell pack. For example, manifold 100 can be used to input anolyte solutions to each cell pack, manifold 102 can be used to accept output anolyte solutions from each cell pack, manifold 104 can be used to input catholyte solutions to each cell pack and manifold 106 can be used to accept output catholyte solutions from each cell pack. To the extent there are mixed liquid and gas phase outputs from each cell 20, additional manifolds can be used to accept the gas phase outputs. Like the cells themselves, the cell pack manifolds 100, 102, 104, 106 are preferably constructed of a material which is resistant to corrosion from acid, hazardous organic waste or ions, such as PVDF. Suitable corrosion resistant screw-on or lock-on attachments should be used to connect the manifold ends to the various external cell ports 36, 38, 40, 42. Either outside the cell pack or at each port connection, corrosion resistant valves, such as valve 97, can be attached to each manifold 100, 102, 104, 106 to control electrolyte flow. By turning off fluid flow with these valves, the replacement of defective cells 20 in the cell pack 80 can be greatly facilitated.

Figure 7:
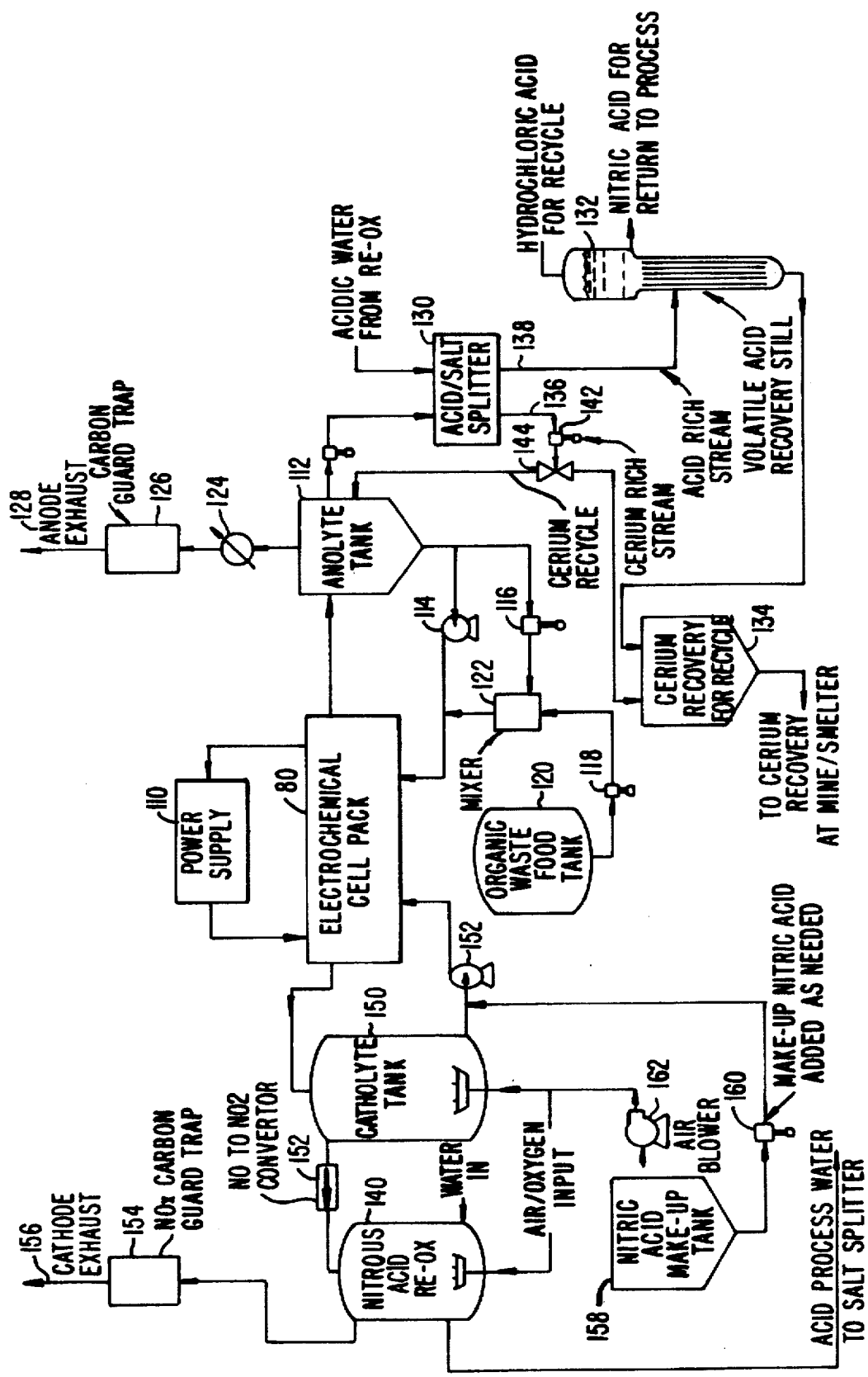
FIG. 7 is a process flow diagram for a cerium mediated oxidation of hazardous organic wastes using the cell and cell packs of the present invention.

The cells 20 and cell packs 80 of the present invention can advantageously be used in an MEO process for breaking down hazardous organic wastes. A flow chart for such a cerium MEO process is shown in FIG. 7. At the heart of such a cerium mediated process is the previously described electrochemical cell pack 80. This electrochemical cell pack 80 conducts both anode processes and cathode processes.

The anode processes begin with electron removal (oxidation) from cerium ions ($Ce^{3+}$) at the anode plates. The oxidized cerium ion ($Ce^{4+}$) then proceeds to oxidize the hazardous organic waste to begin the waste degradation process. In so doing, the oxidized cerium ion returns to its base state (i.e., $Ce^{3+}$) to be ready to perform further oxidation processes. Pertinent chemical equations for the anode processes, in both generic form and for a styrene organic waste example, are as follows:

$$Ce^{3+} \longrightarrow Ce^{4+} + e^{-}$$

$$C_\beta H_\gamma Cl_\delta N_\eta O_\zeta P_\theta S_\kappa + \lambda H_2O \longrightarrow \beta CO_2 + \mu H^+ + \delta HCL + \eta HNO_3 +$$

$$\theta H_3PO_4 + \kappa H_2SO_4 + \mu e^{-}$$

$$C_6H_8 + 16H_2O \longrightarrow 8CO_2 + 24H^+ + 24e^{-}$$

While oxidation processes are occurring in the anolyte solutions of the cell pack 80 at the various anode reaction surfaces, reduction processes are concurrently occurring for nitric acid ($HNO_3$) in the catholyte solutions at the various cathode reaction surfaces. These reduction processes are aided by hydrogen ions ($H^+$) which pass from the anolyte solution to the catholyte solutions through the ion exchange membranes 58. The pertinent equation for this cathode reduction process is as follows:

$$\mu/2\ HNO_3 + \mu H^+ + \mu e^{-} \rightarrow \mu/2\ H_2O + \mu HNO_2$$

To regenerate nitric acid for use in further cathode reactions, the step of reoxidizing nitrous acid ($HNO_2$) in a nitrous acid reoxidation tank is preferably added to the cathode processes:

$$HNO_2 + \frac{1}{2}O_2 \rightarrow HNO_3$$

With these basic anode and cathode processes in mind for the cerium MEO process, the flow chart shown in FIG. 7 can be better understood. Anolyte tank 112 stores anolyte solution for use in the electrochemical cell pack 80. Initially, this anolyte solution consists of nitric acid, water and cerium ion ($Ce^{3+}$). Through gate valves 116, 118, appropriate amounts of this initial anolyte solution are mixed in mixer 122 with hazardous organic waste from the organic waste feed tank 120 and then sent by pump 114 along with fresh anolyte solution, into electrochemical cell pack 80 for processing at the anode reaction surfaces. To the extent the hazardous organic waste comes in a solid form, it must be shredded and liquified before being placed in the organic waste feed tank 120. Suitable shredders can be obtained from International Shredders and O&E Machine Corp. of Green Bay, Wis. as well as Franklin Miller, Inc. of Livingston, N.J. The electrical power for conducting both the anode and cathode reactions is supplied by power supply 110.

After anode reactions have taken place in the electrochemical cell pack 80, reacted anode solution is returned to the anolyte tank 112. This reacted anode solution includes not only nitric acid, water and cerium ions but also reaction byproducts such as carbon dioxide and water. A condenser 124 and carbon guard trap 126 are connected to the anolyte tank to recover some of these byproducts, such as water, in a liquid phase, and to assure that any nitrogen oxides ($NO_x$) are caught in the guard trap 126, rather than being exhausted. As such, the anode exhaust gases 128 should consist only of carbon dioxide and water vapor. A suitable guard trap for catching nitrogen oxides can be obtained from Misonex of Farmingdale, N.Y.

Within the anode tank at this point, there will be a number of organic reaction intermediates mixed with the anolyte solution. To fully process these intermediates, the anolyte solution is sent back into the electrochemical cell pack 80 after being mixed with further organic wastes for as many times as is required to break down all the hazardous organic wastes into relatively harmless end products (e.g., water, carbon dioxide). When the process is nearing completion, the current drawn from the power supply 110 will dwindle. This reduction of a current demand indicates that no further chemical reactions are taking place. To automate the process, a computer (not shown) can be used to track the current demand and control all the valves and pumps.

To recover and regenerate nitric acid and cerium for the anolyte solution, an acid/salt splitter 130, a distillation column 132 and a cerium recovery unit 134 are provided. The acid/salt splitter 130 is an ion exchanger which produces a cerium rich stream 136 and a nitric acid rich stream 138. Suitable acid/salt splitters 130 can be obtained from ECO-Tec, Inc. of Pickering, Canada. One of the feed streams to the acid/salt splitter comes from the nitrous acid re-oxidation unit 140 which regenerates nitric acid ($HNO_3$) from nitrous acid ($HNO_2$). The cerium rich stream 136 from the acid/salt splitter 130 is, for continuing processes, combined with a fresh cerium stream at gate valve 142 and returned to the anolyte tank 112 through two-way valve 144. Alternatively, when processing of organic wastes is finished, the cerium rich stream 136 can be diverted by the two-way valve 144 into a cerium recovery unit 134. In the cerium recovery unit 134, the cerium rich stream is mixed with sodium carbonate and sodium hydroxide to fix the cerium in a mode where it can be transported to a mine or smelter for regeneration or reuse.

The nitric acid rich stream 138 is sent from the acid/salt splitter 130 to a distillation column 132. If the hazardous organic wastes contains organically bound phosphorous, chlorine, sulfur or metals, this nitric acid rich stream will include hydrochloric acids, phosphoric acids, sulfuric acids or metal cations. In the distillation column 132, the phosphoric and sulfuric acids are sent out the bottom of the column to be precipitated or neutralized. By contrast, hydrochloric and nitric acids are distilled out of the top and middle of the distillation column 132 for reuse in the electrochemical process. Suitable distillation columns can be obtained from ECO-Tec, Inc. of Pickering, Ontario, Viatec Recovery Systems of Richland, Wash. or Kinetico Engineering Systems of Richland, Wash.

Turning now to the catholyte solution processing equipment shown in FIG. 7, a catholyte tank 150 is used to supply catholyte solution to the electrochemical cell pack 80. Initially, this catholyte tank 150 contains only a nitric acid solution which is sent into the electrochemical cell pack 80 by pump 152. When used catholyte is returned from the electrochemical cell pack 80, it contains not only nitric acid ($HNO_3$) but also substantial amounts of nitrous acid ($HNO_2$). As previously noted, a nitrous acid reoxidation unit 140 is provided to regenerate nitric acid from nitrous acid.

A nitric acid make-up tank 158 is also included among the catholyte equipment to freshen and replenish the supply of nitric acid in the catholyte tank as appropriate. The amount of nitric acid supplied from this nitric acid make-up tank 158 is regulated by gate valve 160. Finally, an air blower 162 is provided to oxygenate both the catholyte tank 150 and the nitrous acid reoxidation tank 140.

A nitrogen oxide converter 152 and carbon guard trap 154 are included in the catholyte processing equipment to prevent any nitrogen oxide ($NO_x$) compounds which may be produced from escaping into the environment. The gaseous exhaust from the catholyte processing equipment should consist only of steam.

The equipment and processes for a cobalt (Co) mediated processing of hazardous organic wastes are essentially the same as those described for the cerium (Ce) mediated process. Of course, rather than having an oxidation of cerium at the anode reaction surfaces, cobalt would instead be oxidated in a cobalt mediated process:

$$Co^{3+}+H_2O \rightarrow HO+H^++Co^{2+}$$

Either nitric acid or sulfuric acid may be chosen as the background electrolyte for cobalt mediated processes. To the extent sulfuric acid is so chosen, some of the process steps and equipment would need to be altered as known in the art to accommodate the particular chemistry of sulfuric acid.

In the foregoing description, the invention has been described with reference to specific preferred embodiments and methods. It will, however, be evident to those of skill in the art that various modifications and changes may be made without departing from the broader spirit and scope of the invention as set forth in the appended claims. The specification and drawings are, accordingly, to be regarded in an illustrative, rather than restrictive, sense; the invention being limited only by the appended claims.

What is claimed is:

1. An electrochemical cell for performing electrochemical processes comprising:
   a corrosion resistant housing which is formed in one piece as a monolithic structure with an opening left in an upper portion for a top plate;
   a top plate having a first port for inputting chemicals into the cell and a second port for outputting chemicals from the cell, said top plate fitted to said opening in the upper portion of the cell to allow the cell to be sealed;
   a plurality of electrode plates aligned in parallel within said housing so as to leave space between them for internal chemical flow from the bottom of the cell to the top, said electrode plates being capable of imparting an electrical charge to chemicals which come in contact with them;
   an internal input manifold connected to said first port for taking inputted chemicals to be processed from the top of the cell to the bottom and then distributing such chemicals upward so as to be in contact with said electrode plates;
   an internal output manifold connected to said second port for receiving processed chemicals which have come in contact with said electrode plates and removing them from the cell.

2. The electrochemical cell of claim 1 wherein said housing is made from plastic.

3. The electrochemical cell of claim 2 wherein said plastic is polyvinylidene fluoride (PVDF) plastic.

4. The electrochemical cell of claim 2 wherein said plastic is a polytetrafluoroethylene (PTFE).

5. The electrochemical cell of claim 1 wherein said electrode plates are made from platinum plated titanium.

6. The electrochemical cell of claim 1 wherein said electrode plates includes an anode end plate and a cathode end plate.

7. The electrochemical cell of claim 6 wherein the edges of said anode end plate and said cathode end plate are formed integrally with said cell housing.

8. The electrochemical cell of claim 6 wherein electricity is supplied to said anode end plate and said cathode end plate through electrode posts, each of said electrode posts extending through said cell housing so as to be in simultaneous contact with both an external source of electricity and an internal electrode end plate.

9. The electrochemical cell of claim 6 further including a plurality of intermediate electrode plates between said anode end plate and said cathode end plate.

10. The electrochemical cell of claim 9 wherein said intermediate electrode plates carry an electrical charge which is induced by said anode end plate and said cathode end plate.

11. The electrochemical cell of claim 9 wherein each of said intermediate electrode plates carries an electrical charge which is independent of charges on said anode and cathode end plates.

12. The electrochemical cell of claim 1 wherein an ion exchange membrane is interposed between each set of adjacent electrode plates.

13. The electrochemical cell of claim 1 adapted to be used in a mediated electrochemical oxidation (MEO) process.

14. The electrochemical cell of claim 1 wherein there are separate input ports and input manifolds for anolyte and catholyte chemical solutions to be processed.

15. The electrochemical cell of claim 1 wherein there are separate output ports and output manifolds for anolyte and catholyte chemical solutions which have been processed.

16. The electrochemical cell of claim 1 further including a plurality of V-grooved baffles connected to said input manifold for evenly distributing chemicals across the surfaces of said electrode plates.

17. An electrochemical cell for performing mediated electrochemical oxidation (MEO) processes with separate anolyte and catholyte solutions comprising:
   a corrosion resistant housing which is formed in one piece as a monolithic structure with an opening left in an upper portion for a top plate;
   a top plate having a first port for inputting chemicals into the cell and a second port for outputting chemicals from the cell, said top plate fitted to said opening in the upper portion of the cell to allow the cell to be sealed;
   a plurality of electrode plates aligned in parallel within said housing so as to leave space between them for internal flow of anolyte and catholyte solutions from the bottom of the cell to the top, said electrode plates being capable of imparting an electrical charge to chemical solutions which come in contact with them;
   ion exchange membranes which are interposed between each set of adjacent electrode plates to physically separate the anolyte and catholyte solutions contacting said plates while allowing selected ions to pass between such solutions;
   ports on said top plate for separately inputting anolyte and catholyte solutions to be processed in the cell and ports on said top plate for outputting processed anolyte and catholyte solutions from the cell;
   internal input manifolds connected to said input anolyte and catholyte ports for taking inputted anolyte and catholyte solutions from the top of the cell to the bottom and then separately distributing such solutions upward so as to separately be in contact with separate reaction surfaces of said electrode plates;

an internal output manifold connected to said output anolyte and catholyte ports for receiving processed anolyte and catholyte solutions which have come in contact with said electrode plates and removing them from said cell.

18. An electrochemical cell pack for performing electrochemical processes comprising:

a corrosion resistant housing which is formed in one piece as a monolithic structure with an opening left in an upper portion for a top plate;

a removable top plate fitted to said opening in the upper portion of the cell pack to allow the cell pack to be removably sealed;

a plurality of electrochemical cells within said housing;

an input manifold for receiving chemicals to be processed from outside of the cell pack and distributing said chemicals into each of said electrochemical cells;

an output manifold for taking processed chemicals from each of said electrochemical cells and removing them from the cell pack;

electrical cables for providing electrical current to each of said electrochemical cells from a source of electricity outside the cell pack.

19. The cell pack of claim 18 wherein said cell pack housing is made from plastic.

20. The cell pack of claim 19 wherein said plastic is polyvinylidene fluoride (PVDF) plastic.

21. The cell pack of claim 18 wherein each of said electrochemical cells comprises:

a corrosion resistant housing which is formed in one piece as a monolithic structure with an opening left in an upper portion for a top plate;

a top plate having a first port for inputting chemicals into the cell and a second port for outputting chemicals from the cell, said top plate fitted to said opening in the upper portion of the cell to allow the cell to be sealed;

a plurality of electrode plates aligned in parallel within said housing so as to leave space between them for internal chemical flow from the bottom of the cell to the top, said electrode plates being capable of imparting an electrical charge to chemicals which come in contact with them;

an internal input manifold connected to said first port for taking inputted chemicals to be processed from the top of the cell to the bottom and then distributing such chemicals upward so as to be in contact with said electrode plates;

an internal output manifold connected to said second port for receiving processed chemicals which have come in contact with said electrode plates and removing them from the cell.

22. The cell pack of claim 18 wherein electrical current is provided in series to each of said electrochemical cells.

23. The cell pack of claim 18 wherein electrical current is provided in parallel to each of said electrochemical cells.

24. A mediated electrochemical oxidation (MEO) process for treating hazardous organic wastes comprising the steps of:

forming an anolyte solution from a metal catalyst, acid, water and hazardous organic waste;

forming a catholyte solution from acid and water;

selecting an effectively leakproof electrochemical cell with a plurality of charged electrode plates which can simultaneously process both anolyte and catholyte solutions;

separately introducing said anolyte and catholyte solutions into said electrochemical cell;

separately placing said anolyte and catholyte solutions in contact with said charged electrode plates to cause oxidation reactions in said anolyte solution and reduction reactions in said catholyte solution;

keeping said anolyte and catholyte solutions physically separated in said cell except for allowing selected ions to be exchanged between said solutions;

separately removing processed anolyte and catholyte solutions from said electrochemical cell.

25. The process of claim 24 further including the step of:

recycling processed anolyte and catholyte solutions into said electrochemical cell until significant oxidation and reduction reactions cease to occur.

26. The process of claim 25 further including the step of:

monitoring electrical current usage in said electrochemical cell to determine when significant oxidation and reduction reactions have ceased to occur.

27. The process of claim 24 wherein said metal catalyst is cerium (Ce) and said acid is nitric acid ($HNO_3$).

28. The process of claim 24 wherein said metal catalyst is cobalt (Co) and said acid is nitric acid ($HNO_3$).

29. The process of claim 24 wherein said metal catalyst is cobalt (Co) and said acid is sulfuric acid ($H_2SO_4$).

30. The process of claim 24 wherein said effectively leakproof electrochemical cell comprises:

a corrosion resistant housing which is formed in one piece as a monolithic structure with an opening left in an upper portion for a top plate;

a top plate having a first port for inputting chemicals into the cell and a second port for outputting chemicals from the cell, said top plate fitted to said opening in the upper portion of the cell to allow the cell to be sealed;

a plurality of electrode plates aligned in parallel within said housing so as to leave space between them for internal chemical flow from the bottom of the cell to the top, said electrode plates being capable of imparting an electrical charge to chemicals which come in contact with them;

an internal input manifold connected to said first port for taking inputted chemicals to be processed from the top of the cell to the bottom and then distributing such chemicals upward so as to be in contact with said electrode plates;

an internal output manifold connected to said second port for receiving processed chemicals which have come in contact with said electrode plates and removing them from the cell.

* * * * *